United States Patent [19]
Barnard et al.

[11] Patent Number: 5,280,549
[45] Date of Patent: Jan. 18, 1994

[54] FREQUENCY DEPENDENT OPTICAL ISOLATOR

[75] Inventors: Chris Barnard, Gloucester; Neil Teitelbaum, Ottawa, both of Canada

[73] Assignee: National Research Council of Canada, Ontario, Canada

[21] Appl. No.: 14,280

[22] Filed: Feb. 5, 1993

[51] Int. Cl.$^5$ .............................. H01J 5/16; G02B 6/28
[52] U.S. Cl. ............................... 385/15; 385/24; 385/27; 385/42; 359/114
[58] Field of Search ............... 385/15, 24, 27, 39, 385/42; 359/114, 127, 195

[56] References Cited
U.S. PATENT DOCUMENTS

| | | | |
|---|---|---|---|
| 4,899,043 | 2/1990 | Mochizuki et al. | 359/114 X |
| 4,952,017 | 8/1990 | Henry et al. | 385/15 X |
| 4,972,513 | 11/1990 | Mochizuki et al. | 385/31 X |
| 5,084,779 | 1/1992 | Stanley | 359/154 X |
| 5,101,291 | 3/1992 | Jopson | 359/124 |
| 5,200,964 | 4/1993 | Huber | 372/96 X |

Primary Examiner—John D. Lee
Assistant Examiner—Hemang Sanghavi

[57] ABSTRACT

A frequency dependent optical isolator is provided which allows two signals transmitted on a single optical fiber to be isolated in dependence upon their frequencies. A signal having a frequency f1 propagates through the isolator in one direction from a first input/output port to a second input/output port and is prevented from propagating in the reverse direction. A signal having a frequency f2 propagates through the isolator from the second input port to the first input port and is prevented from propagating in the reverse direction. After either of the signals propagates through the isolator from one input/output port to the other, the isolator prevents the respective signal from traveling backwards in a reverse direction through the isolator. The frequency dependent isolator may be used with an amplifier or may amplify one or more of the signals propagating through.

16 Claims, 5 Drawing Sheets

FREQUENCY DEPENDENT OPTICAL ISOLATOR

FIELD OF THE INVENTION

The present invention relates generally to optical isolators, and more particularly relates to frequency dependent optical isolators.

BACKGROUND OF THE INVENTION

In long distance optical fiber communication systems, repeaters are often required between a transmitter in the form of a light source and a photodetector receiver. Repeaters compensate for signal power attenuation in an optical fiber and reshape signals. In the past, repeaters have often included an optical to electrical converter in the form of a photodetector, electronic amplifiers to amplify a converted electrical signal, a signal processor, and an electrical to optical converter in the form of a laser or light emitting diode (LED). Currently, electrical repeaters are being replaced by various types of direct optical amplifiers. Advantageously, these direct optical amplifiers provide large gain (>40 dB), high bandwidth (>1 THz), transparency to bit rate, and the ability to simultaneously amplify multiplexed and bi-directional signals. In addition to replacing repeaters, direct optical amplifiers have other applications such as power amplifiers for boosting transmitted power, compensating for losses due to signal splitting, and as optical preamplifiers for improving receiver sensitivity.

Two types of direct optical amplifiers that perform well are rare earth doped fiber amplifiers and traveling wave semiconductor laser amplifiers. In a semiconductor optical amplifier, electrons and holes are injected into a semiconductor optical waveguide by means of an electrical current. Amplification of a signal occurs as it propagates through the waveguide by the process of stimulated emission in which photons are generated by electron-hole recombination. In rare earth doped fiber amplifier a pump laser at a shorter wavelength than the signal wavelength excites the rare earth ions to a metastable level. Amplification of the signal then occurs by the process of stimulated emission in which the excited ions fall back to the ground state, giving up their energy in the form of a photon that is coherent with the stimulating photon. The signal and pump light are coupled into the doped fiber by a wavelength division multiplexor which typically consists of two fibers melted or polished together.

In an optical fiber transmission line having direct optical amplifiers, optical isolators may be used to prevent reflected light and amplified spontaneous emission noise generated by the amplifiers from damaging the lasers and to prevent multiple reflections that can limit the receiver sensitivity. Multiple reflection induced relative intensity noise at the receiver can reduce an optical amplifier gain to less than 20 dB. Even if there are no reflections present, Rayleigh backscattering (RBS) can limit the amplifier gain to less than 20 dB. An optical isolator is a device that transmits light in one direction while strongly attenuating light in the reverse direction.

However, certain applications require that an optical fiber transmission line support bi-directional signal propagation. Optical time domain reflectometry (OTDR), the standard method used for fault location of fiber networks, transmits pulses into the fiber from one end of an optical fiber transmission line and detects faults by monitoring backscattered and backreflected light at the same end. Bi-directional propagation is also required for applications that transmit light in both directions along the same fiber.

Since optical isolators only allow unidirectional signal propagation they do not allow bi-directional signaling.

U.S. Pat. No. 4,899,043 in the name of Moschizuki et al. issued Feb. 6, 1990, entitled Fault Monitoring System For Optical Fiber Communication Systems discloses a fault monitoring system in a bi-directional optical fiber communication system. The system provides a bi-directional amplifier disposed between first and second optical transmission lines. A first optical signal is transmitted from one side of the transmission line, is amplified by a bi-directional amplifier and directed back to the transmission side, and is monitored. A second optical signal is transmitted from another side, is amplified by a bi-directional amplifier, and is transmitted back to the other side. The system further allows transmission of another signal of a different frequency from one side to the other amplified by the bi-directional amplifier.

U.S. Pat. No. 4,933,990 in the name of Mochizuki et al issued Jun. 12, 1990 disclose an optical privacy communication system in optical fiber communications between many points. Each station is provided with a privacy circuit the privacy circuit comprising a first and second optical branch. An isolator is inserted on the first optical branch, for passing only a signal of a direction from the first optical branch to the second optical branch, and an optical filter inserted in the second optical branch, for passing only an optical signal of a frequency assigned to the station, so that an optical privacy communication is carried out between stations.

In U.S. Pat. No. 4,972,513 in the name of Mochizuki et al. issued Nov. 20, 1990, a mulit-point amplification repeating system is disclosed in which an output of a unidirectional amplifier inserted in a unidirectional repeating optical transmission system is branched and coupled to an input of a unidirectional amplifier inserted in another unidirectional repeating optical transmission system, so that bi-directional optical communication can be performed between many points connected to a plurality of first optical transmission lines.

Although Mochizuki's inventions appear to perform their intended functions, they do not provide isolation of two bi-directional signals being amplified and transmitted on the same optical fiber from one end to the other.

SUMMARY OF THE INVENTION

It is an object of the invention to provide a method and device for isolating counter propagating optical signals.

In is a further object of the invention to provide a method and device for amplifying counter propagating optical signals transmitted on an optical fiber.

It is yet a further object of the invention to provide a method and device for optical time domain reflectometry.

In accordance with an aspect of the invention there is provided a frequency dependent optical isolator having a first input/output port and a second input/output port comprising: first means connected in series between the first and second input/output ports for allowing a first optical signal having a frequency $f_1$ to propagate from the first input/output port to the second input/output port and for at least substantially preventing a second optical signal having a frequency of $f_2$ from propagating from the first input/output port to the second input/output port; means connected in series with the first means, for preventing the first optical signal from propagating from the second input/output port to the first input port; second means connected in series between the first and second input/output ports for allowing a second optical signal to propagate from the second input/output port to the first input/output port and for at least substantially preventing the first optical signal from propagating from the second input/output port to the first input port; and, means connected in series with the second means for preventing the second optical signal from propagating from the first input/output port to the second input/output port.

In accordance with the invention there is further provided, a frequency dependent optical isolator having a first input/output port and a second input/output port comprising: first means along a first optical path between the first and second input/output ports for allowing a first optical signal having a frequency $f_1$ to propagate from the first input/output port to the second input/output port and for at least substantially preventing a second optical signal having a frequency of $f_2$ from propagating from the first input/output port to the second input/output port; means along the first optical path, for preventing the first optical signal from propagating from the second input/output port to the first input port; second means along a second optical path between the first and second input/output ports for allowing a second optical signal to propagate from the second input/output port to the first input/output port and for at least substantially preventing the first optical signal from propagating from the second input/output port to the first input port; and, means along the second optical path for preventing the second optical signal from propagating from the first input/output port to the second input/output port.

In accordance with the invention there is further provided, a frequency dependent optical isolator having a first input/output port and a second input/output port comprising: first means connected in series between the first and second input/output ports for allowing a first optical signal having a frequency $f_1$ to propagate from the first input/output port to the second input/output port and for at least substantially preventing a second optical signal having a frequency of $f_2$ from propagating from the first input/output port to the second input/output port; means connected in series with the first means, for preventing the first optical signal from propagating from the second input/output port to the first input port; means connected between the first and second input/output ports for preventing a second optical signal from propagating from the first input/output port to the second input/output port.

In accordance with another aspect of the invention a frequency dependent optical isolator having a first input/output port and a second input/output port is provided, comprising an optical circulator for directing a first optical signal having frequency $f_1$ from the first input/output port to a first optical filter and for directing the first optical signal reflected from the first optical filter to the second input/output port, the first filter not reflecting optical signals having a frequency $f_2$ towards the second input/output port, the optical circulator for directing a second optical signal having frequency $f_2$ from the second input/output port to a second optical filter and for directing the second optical signal reflected from the second optical filter to the first input/output port, the second filter not reflecting optical signals having a frequency $f_1$ towards the first input/output port.

In accordance with another aspect of the invention in a system where an optical fibre is interrupted at a first and a second branch point, the branch points being connected by a first and a second branch path, and wherein a first optical signal having a frequency of $f_1$ and a second optical signal having a frequency of $f_2$ are being transmitted in opposite directions within the optical fiber, a method of optically isolating the first and second signals is provided comprising the steps of: separating the signals so that the first optical signal propagates along the first branch path in a first direction from the first branch point to the second branch point and the second signal propagates along a second branch path in a second direction from the second branch point to the first branch point; preventing a substantial amount of the first signal from propagating from the second branch point to the first branch point; preventing a substantial amount of the second signal from progagating from the first branch point to the second branch point; preventing a substantial amount of the first signal from counter propagating along the first branch path in a reverse direction; and preventing a substantial amount of the second signal from counter propagating along the second branch path in a reverse direction; and, preventing the second signal from counter propagating along the second path in a reverse direction.

Advantageously, the invention provides a method and device which allows two counter propagating signals to be transmitted and amplified on a single optical fiber yet isolating the signals in a manner that allows them to propagate in their respective counter propagating directions and does not allow either of the signals to travel in their respective reverse directions. Furthermore, the invention provides a method of performing OTDR testing in which a frequency dependent isolator is installed.

BRIEF DESCRIPTION OF THE DRAWINGS

Exemplary embodiments of the invention will be described in conjunction with the drawings in which.

DETAILED DESCRIPTION

The function of the frequency dependent optical isolator shown in the figures is to allow transmitted light at frequency $f_1$ to propagate in a first direction, but not in the reverse direction and to allow transmitted light at frequency $f_2$ to propagate in the reverse direction, but not in the first direction. When used with one or more optical amplifiers the isolator will amplify signals at frequency $f_1$ in one direction and attenuate light at frequency $f_1$ in the reverse direction. At the same time it will amplify signals at frequency $f_2$ in the reverse direction and attenuate light at frequency $f_1$ in the original direction.

Figure 1:
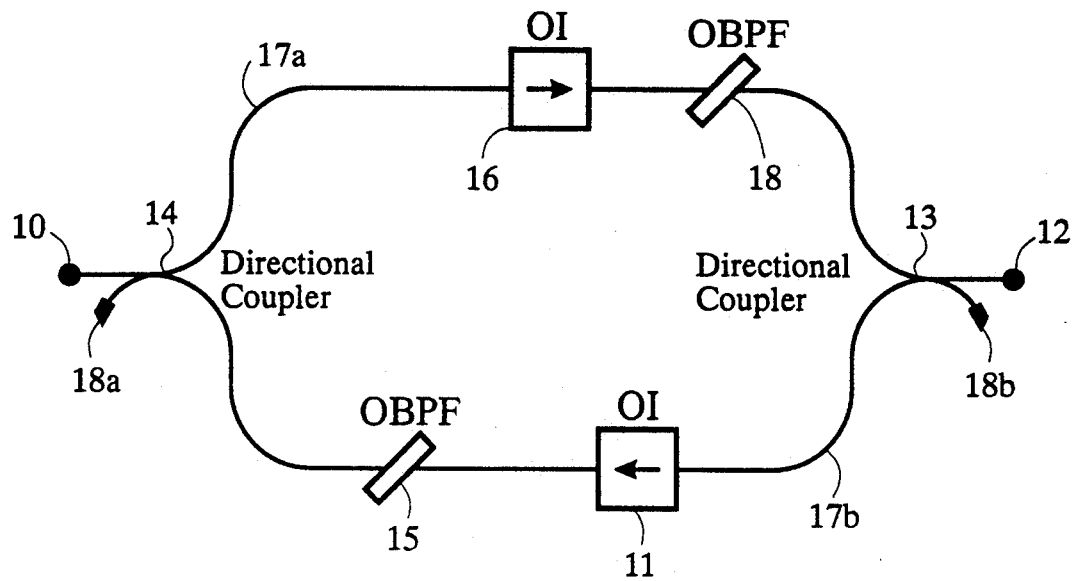
FIG. 1 is a block circuit diagram illustrating an embodiment of a frequency dependent optical isolator using two directional couplers, two optical band-reflection filters, and two optical isolators.

Referring to FIG. 1, a first embodiment of the frequency dependent optical isolator is shown having a first directional coupler 14, a second directional coupler 13, first and second optical band-pass filters 18 and 15 respectively, a first and second optical isolator 16 and 11, and first and second separate fiber paths or branches 17a and 17b respectively.

In operation, as an optical signal having a frequency $f_1$ is coupled into a first input/output port 10, the first directional coupler 14 divides the light between the first optical fiber branch 17a and the second optical fiber branch 17b. Optical signals having a frequency $f_1$ which propagate along the first optical fiber branch 17a and will propagate through the first optical isolator 16 and the first optical filter 18 which is designed to allow light at frequency $f_1$ to pass and to attenuate light at frequency $f_2$. The filter 18 can be for example, a multilayer dielectric film oriented at an angle away from the normal. Once light has passed through the filter 18, a fraction of the light is guided by the second optical fiber directional coupler 13 to the second input/output port 12 and a fraction is lost at a fiber termination 18b. The termination 18b is designed to prevent light from being reflected back into the fiber. This can be done, for example, by polishing the fiber end at an angle from the normal. The fraction of light at frequency $f_1$ that is directed by the first directional coupler 14 into the second optical fiber path is attenuated by the second optical band-pass filter 15, which is designed to transmit light at frequency $f_2$, and attenuate light at frequency $f_1$. The fraction of the signal light at frequency $f_1$ entering the first input/output port 10 that is directed to the first optical fiber path 17a, is thus transmitted to the second input/output port 12 while the fraction of the signal light at frequency $f_1$ entering the first input/output port 10 that is directed to the second optical fiber path 17b is attenuated.

Light at frequency $f_1$ entering the second input/output port 12 is divided by the second directional coupler 13 into the two optical fiber paths 17a and 17b. In the first optical branch 17a, the light propagates through the first optical band-pass filter 18, and is attenuated by the first optical isolator, 16. In the second optical branch 17b, the light propagates through the second optical isolator 11 and is attenuated by the second optical band-pass filter 15. Signal light at frequency $f_1$ entering the second input output port 12 is thus attenuated.

As an optical signal at a frequency $f_2$ is coupled into the second input/output port 12, the second directional coupler 13 divides the light between the first optical fiber branch 17a and the second optical fiber branch 17b. In the first optical fiber branch 17a, the light is attenuated by the first optical filter 18. In the second optical fiber branch 17b, the light is transmitted by the second optical isolator 11 and the second optical filter 15. Once light passes through the second optical filter 15, a fraction of the light is guided by the first optical fiber directional coupler 14 to the first input/output port 10 and a fraction is lost at the fiber termination 18a. The fraction of the signal light at frequency $f_2$ entering the second input/output port 12 that is directed to the second optical fiber path 17b is thus transmitted to the first input/output port 10 while the fraction of the signal light at frequency $f_2$ entering the second input/output port 12 that is directed to the first optical fiber path 17a is attenuated.

When light at frequency $f_2$ enters the first input/output port 10, it is divided by the first directional coupler 14 into the two optical fiber paths 17a and 17b. In the second optical branch 17b, the light is transmitted by the second optical band-pass filter 15, and is attenuated by the second optical isolator, 11. In the first optical branch 17a, the light is transmitted by the first optical isolator 16 and attenuated by the first optical band-pass filter 18. Signal light at frequency $f_2$ entering the first input output port 10 is thus attenuated. In FIG. 1 the positions of the first optical isolator and first optical band-pass filter are interchangeable and the positions of the second optical isolator and second optical band-pass filter are interchangeable.

Figure 2:
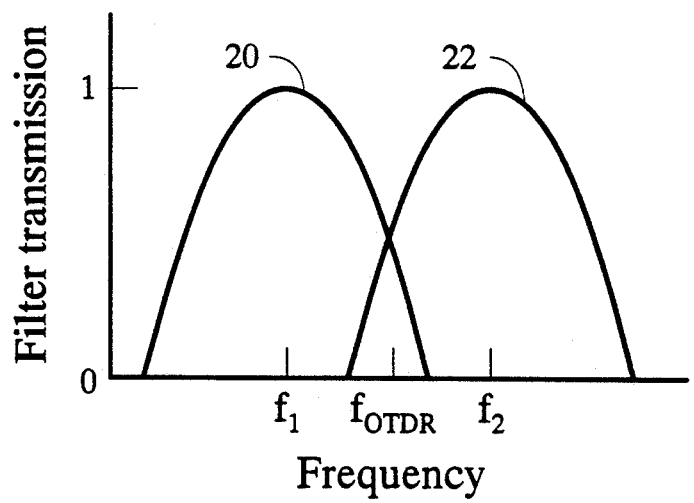
FIG. 2 is a graph of the filter transmission spectra for embodiments shown in FIGS. 1 and 4.

FIG. 2 shows a possible example of the transmission functions of the optical band-pass filters 15 and 18 in FIG. 1. The transmission function 20 of the first optical band-pass filter 18 allows signals at frequency $f_1$ to be transmitted and attenuates signals at frequency $f_2$. The transmission function 22 of the second optical band-pass filter 15 allows signals at frequency $f_2$ to be transmitted and attenuates signals at frequency $f_1$. For OTDR testing the pass bands of the filters can be partially overlapping, as shown, to partially transmit the intermediate OTDR frequency $f_{OTDR}$. If one signal in a bi-directional system is to be used as an OTDR test signal, for example being transmitted from the first input/output port 10 to the second input/output input port 12, the circuit of FIG. 1 may be altered by eliminating the first optical band pass filter. Alternatively, if the OTDR test signal is being transmitted from the side coupled to the second input/output port 12, the second optical band pass filter is eliminated.

Figure 3:
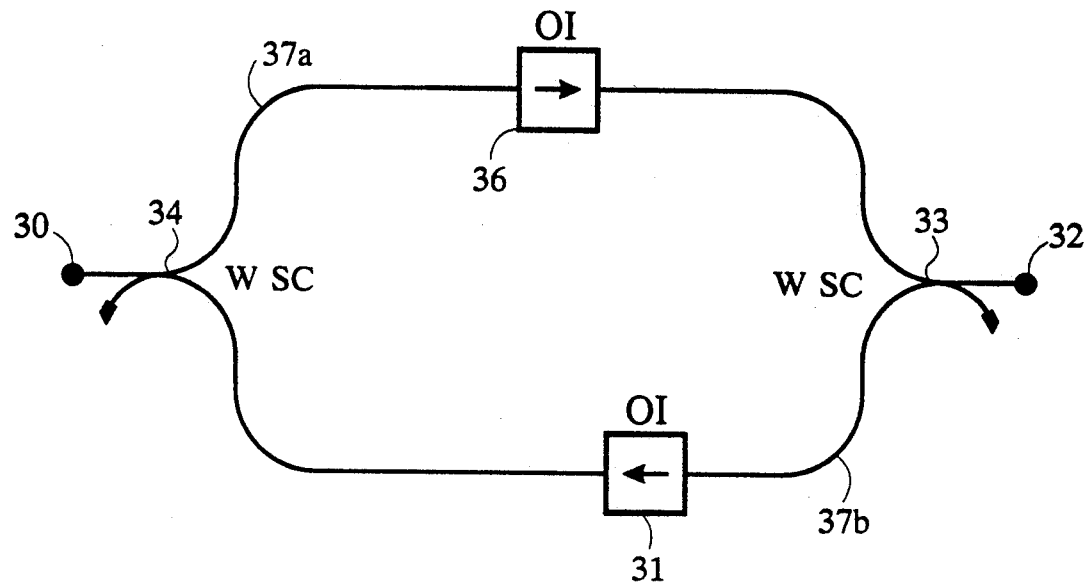
FIG. 3 is a block circuit diagram illustrating a second embodiment of a frequency dependent optical isolator using two fiber wavelength division multiplexers, and two optical isolators.

FIG. 3 shows a second embodiment of the frequency dependent optical isolator having two optical isolators, two fiber paths, and two fiber wavelength selective directional couplers also known as wavelength division multiplexers. The fiber wavelength selective couplers can be, for example, manufactured by selectively melting and pulling two fibers together. For certain wavelengths, these devices are presently available commercially. The wavelength selective couplers are designed to direct light at frequency $f_1$ between the input/output ports through the first optical branch 37a and light at frequency $f_2$ between the input/output ports through the second optical branch 37b.

When an optical signal at a frequency $f_1$ is coupled into the first input/output port 30, the first fiber wavelength selective direction coupler 34 directs the light to the first optical fiber branch 37a. In the first optical fiber branch 37a, the light is transmitted by the first optical isolator 36. The second wavelength selective coupler 33 then directs the light to the second input/output port 32. When light at frequency $f_1$ enters the second input/output port 32, it is directed by the second wavelength selective coupler 33 into the first optical fiber path 37a. The light is then attenuated by the first optical isolator, 36. Light at frequency $f_1$ entering the first input/output port 30 is thus transmitted to the second input/output port 32 whereas light at frequency $f_1$ entering the second input/output port 32 is attenuated.

When an optical signal at a frequency $f_2$ is coupled into the second input/output port 32, the second fiber wavelength selective directional coupler 33 directs the light to the second optical fiber branch 37b. In the second optical fiber branch 37b, the light is transmitted by the second optical isolator 31. The first wavelength selective coupler 34 then directs the light to the first input/output port 30. When light at frequency $f_2$ enters the first input/output port 30, it is directed by the first wavelength selective coupler 34 into the second optical fiber path 37b. The light is then attenuated by the second optical isolator, 31. Light at frequency $f_2$ entering the second input/output port 32 is thus transmitted to the first input/output port 30 while light at frequency $f_2$ entering the first input/output port 30 is attenuated.

Figure 4:
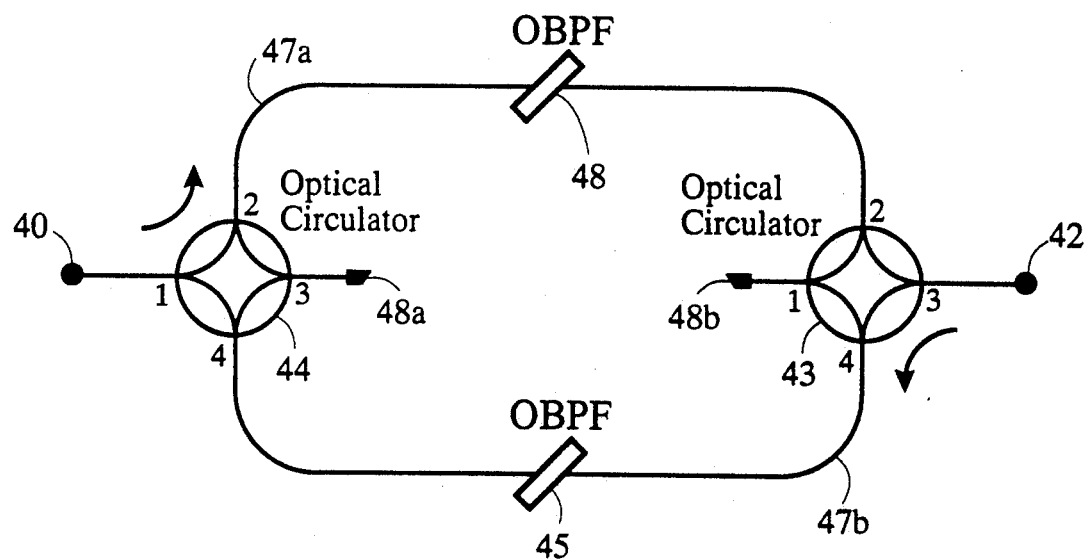
FIG. 4 is a block circuit diagram illustrating a third embodiment of a frequency dependent optical isolator using two optical circulators, and two optical band-pass filters.

FIG. 4 shows a third embodiment of the frequency dependent optical isolator having two optical circulators, two optical band-pass filters, and two optical fiber paths. A fiber coupled optical circulator is a commercially available four port device that directs light as follows: light input to a first port is output at a second port, light input to the second port is output at a third port, light input to the third port is output at a fourth port, and light input to the fourth port is output at the first port. The optical band-pass filters shown have the same transmission function as those shown in FIG. 2.

When optical signals enter the first input/output port 40, the first optical circulator 14 directs the light to the first optical fiber branch 47a. In the first optical fiber branch 47a, the first optical band-pass filter 48 transmits light at frequency $f_1$ and attenuates light at frequency $f_2$. After the filter, the light at frequency $f_1$ is directed by the second optical circulator 43 to the second input/output port 42. Light at frequency $f_1$ entering the first input/output port 40 is thus transmitted to the second input/output port 42 while light at frequency $f_2$ entering the first input/output port 40 is attenuated.

When light enters the second input/output port 42, it is directed by the second optical circulator 43 into the second optical fiber path 47b. In the second optical fiber branch 47b, the second optical band-pass filter 45 transmits light at frequency $f_2$ and attenuates light at frequency $f_1$. After the filter, the light at frequency $f_2$ is directed by the first optical circulator 44 to the first input/output port 40. Light at frequency $f_2$ entering the second input/output port 42 is thus transmitted to the first input/output port 40 while light at frequency $f_1$ entering the second input/output port 42 is attenuated.

Figure 5:
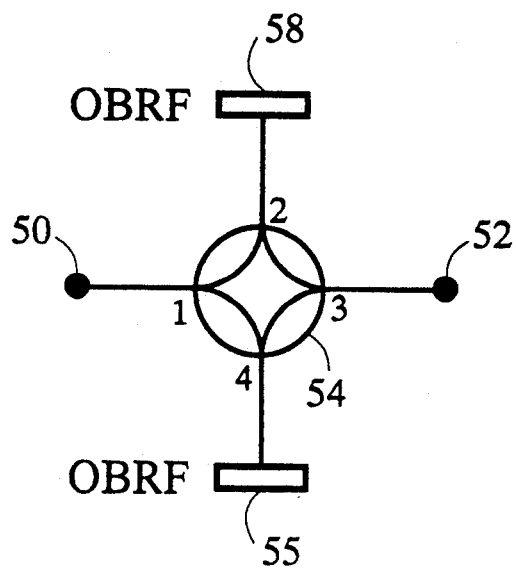
FIG. 5 is a block circuit diagram illustrating a fourth embodiment of the frequency dependent optical isolator using one optical circulator, and two optical band-pass filters.

In FIG. 5 a fourth embodiment of the frequency dependent optical isolator is shown having one optical circulator and two optical band-pass filters. When optical signals enter the first input/output port 50 attached to the optical circulator port 1, the optical circulator 54 directs the light to the first optical band-reflection filter 58 which reflects light at frequency $f_1$ and transmits light at frequency $f_2$. The filter is oriented normally to the optical circulator output port 2 or directly coated to the optical circulator surface so that the reflected light is coupled back into the optical circulator port 2. The light reflected from the filter back into circulator port 2 is then directed by the optical circulator to the second input/output port 52. Light at frequency $f_1$ entering the first input/output port 50 is thus transmitted to the second input/output port 52 while light at frequency $f_2$ entering the first input/output port 50 is attenuated.

When optical signals enter the second input/output port 52 attached to the optical circulator port 3, the optical circulator 54 directs the light to the second optical band-reflection filter 55 which reflects light at frequency $f_2$ and transmits light at frequency $f_1$. The filter is also oriented normally to the optical circulator output 4 or directly coated to the optical circulator surface so that the reflected light is coupled back into the optical circulator port 4. The light reflected from the filter back into circulator port 4 is then directed by the optical circulator to the first input/output port 52. Light at frequency $f_2$ entering the second input/output port 52 is thus transmitted to the first input/output port 50 while light at frequency $f_1$ entering the second input/output port 52 is attenuated.

Figure 6:
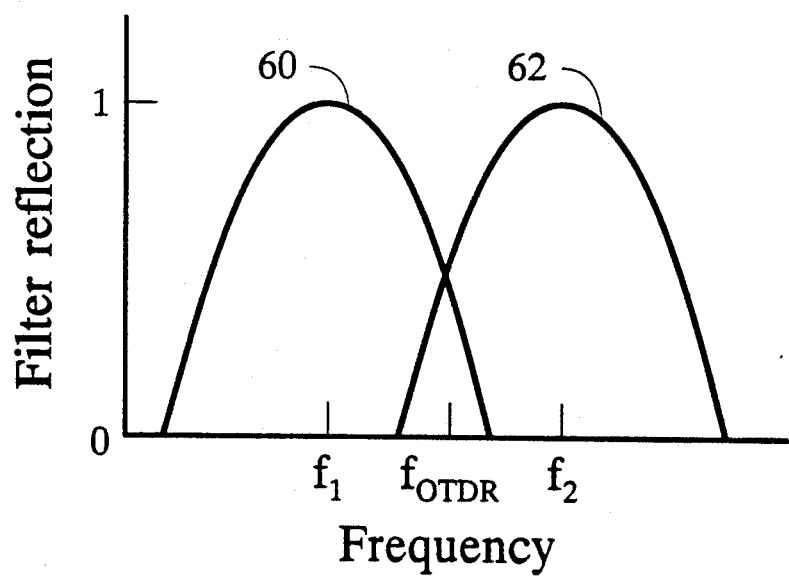
FIG. 6 is a graph of the filter reflection spectra for the embodiment shown in FIG. 5.

FIG. 6 shows a possible example of the reflection functions of the optical band-reflection filters in FIG. 1. The reflection function of the first optical band-reflection filter 60 allows signals at frequency $f_1$ to be reflected back into the circulator port 2 and transmits signals at frequency $f_2$. The reflection function of the second optical band-reflection filter 62 allows signals at frequency $f_2$ to be reflected back into the circulator port 4 and transmits signals at frequency $f_1$. For OTDR testing the reflection bands of the filters can be partially overlapping, as shown, to reflect the intermediate OTDR frequency $f_{OTDR}$.

Figure 7:
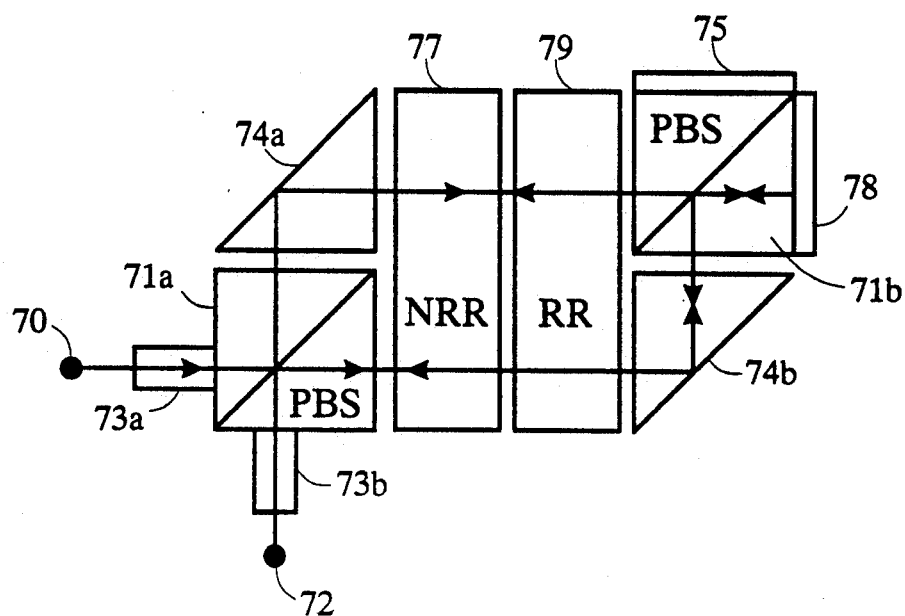
FIG. 7 is a diagram of the embodiment of the frequency dependent optical isolator using one optical circulator, and two optical band-pass filters shown in FIG. 5.

FIG. 7 shows a detailed example of the fourth embodiment of the frequency dependent optical isolator shown in FIG. 5. This embodiment uses two right angle prisms 74a and 74b, two fiber coupling lenses 73a and 73b, two polarizing beam splitting cubes 71a and 71b, a 45° non-reciprocal rotator (e.g., a magneto-optic (Faraday) rotator), and a 45° reciprocal rotator (e.g., a half-wave device). The two rotators are oriented with respect to each other so that light propagating in one direction undergoes a net polarization rotation of 90° and light propagating in the reverse direction undergoes a net polarization rotation of 0°. The polarizing beam splitting cubes are designed to transmit the p-polarized component of incident light and to reflect the s-polarized component of incident light at 90° to the incident beam. The fiber coupling lenses (e.g. GRIN lenses) are designed to collimate light from a fiber and to couple collimated light into the fiber. This embodiment is based on one type of optical circulator (Electron. Lett. vol. 15, pp. 830-831, 1979). Other embodiments may be envisaged based on other optical circulators.

When light enters from the first input/output fiber port 70, it is collimated by the first coupling lens 73a towards the first polarizing beam splitter cube 71a. The p-polarized component is transmitted and the s-polarized is reflected 90° form the incident beam by the beam splitting cube 71. The right angle prism redirects the s-polarized beam so that it propagates through the non-reciprocal rotator 77 and reciprocal rotator 79, parallel with the p-polarized beam. Each beam undergoes a 90° rotation when passing through the non reciprocal rotator 77 and reciprocal rotator 79. The s-polarized component is thus converted to the p-polarization and the p-polarized component is converted to the s-polarization. After the new s-polarized component is reflected from the second right-angle prism 74b, the two polarization components are recombined by the second polarizing beam splitting cube 71b. The first optical band-reflection filter 78 then reflects light at frequency $f_1$ back into the second polarizing beam splitting cube 71b. The cube 71b transmits the p-polarized component and reflects the s-polarized component at 90° which is then reflected by the second polarizing beam splitter cube 74b. The two polarization components then propagate in parallel through the reciprocal rotator 79 and non-reciprocal rotator 77 and undergo a net polarization rotation of 0°. After the p-polarized component is reflected from the first right-angle prism 74a, the two polarization components are recombined by the first polarizing beam splitting cube 71a and directed towards the second fiber coupling lens 73b. The light is then coupled into the second fiber input/output port 72. Light at frequency $f_1$ entering the first input/output port 70 is thus transmitted to the second input/output port 72 while light at frequency $f_2$ entering the first input/output port 70 is transmitted by the optical band reflection filter 78, and lost.

In a similar manner, light entering from the second input/output port 72 is directed towards the second optical band-reflection filter 75 which reflects light at frequency $f_2$ and transmits light at frequency $f_1$. The light reflected by the filter is then directed to the first input/output port 70. Light at frequency $f_2$ entering the second input/output port 72 is thus transmitted to the first input/output port 70 while light at frequency $f_1$ entering the second input/output port 72 is transmitted by the optical band reflection filter 75, and lost.

Bi-directional frequency selective optical amplification is accomplished with any of the four embodiments shown in FIGS. 1,3,4,5,7 by inserting a bi-directional optical amplifier on either or both sides of the frequency dependent optical isolator. In other embodiments, one or more optical amplifiers can be placed anywhere along the fiber paths of the embodiments shown in FIGS. 1,3,4,5.

Figure 8:
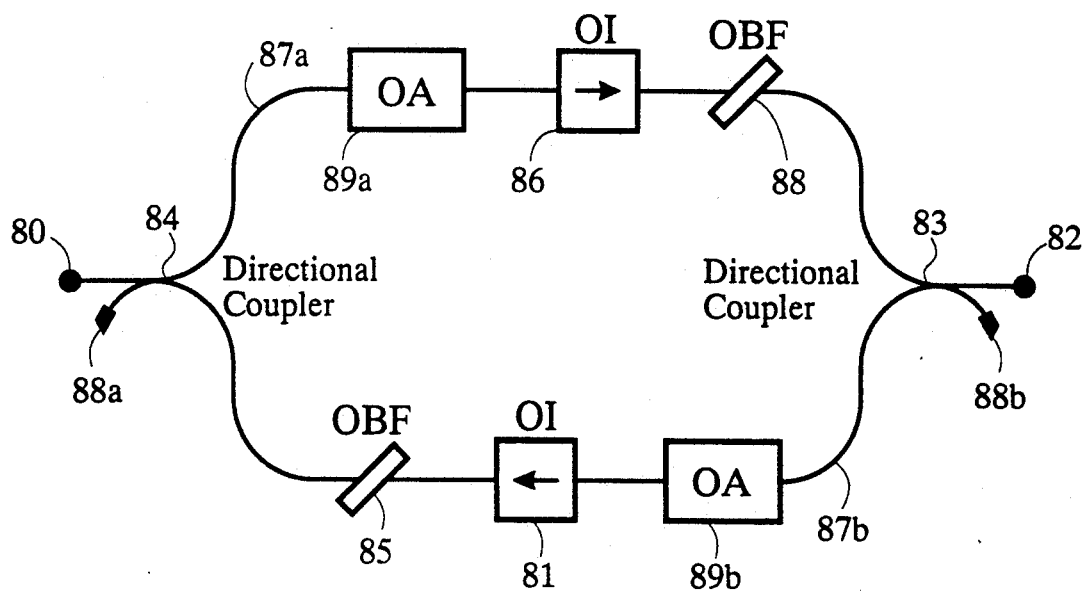
FIG. 8 is a block circuit diagram of a frequency dependent bi-directional optical amplifier using two directional couplers, two optical band-pass filters, two optical amplifiers and two optical isolators; and, FIG. 9 is a block diagram of an embodiment of a frequency dependent bi-directional rare earth doped fiber amplifier using two optical circulators, two optical band-pass filters, two pump lasers, and two rare earth doped fibers.

FIG. 8 shows an embodiment with two optical amplifiers (e.g. rare earth doped fiber amplifiers, semiconductor optical amplifiers, fiber Raman amplifiers, or fiber Brillouin amplifiers) inserted into the embodiment shown in FIG. 1. The connection order of the optical isolators 86 and 81, optical band-pass filters 88 and 85, and optical amplifiers 89a and 89b in each fiber path 87a and 87b is interchangeable. If the amplifiers require a pump laser (e.g. rare earth doped fiber amplifiers) each amplifier may have its own pump laser or the light from one pump laser can be divided among the amplifier by, for example a fiber directional coupler. This embodiment amplifies signals of frequency $f_1$ entering the first input/output port 80 and attenuates signals of frequency $f_1$ entering the second input/output port 82. And, it amplifies signals of frequency $f_2$ entering the second input/output port 82 and attenuates signals of frequency $f_2$ entering the first input/output port 82.

Figure 9:
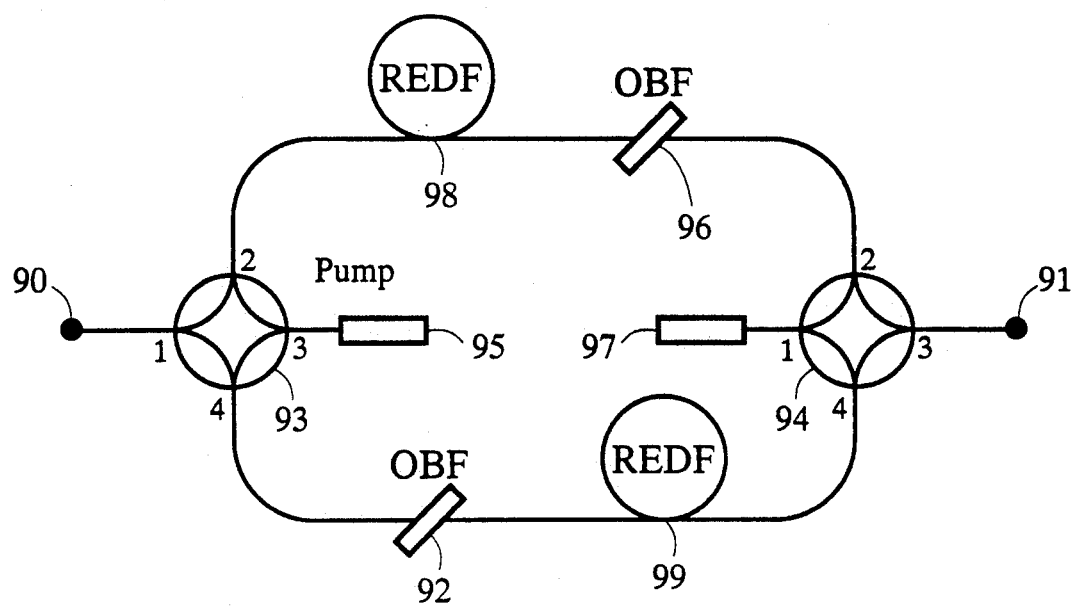

FIG. 9 shows an embodiment with two rare earth doped amplifiers inserted into the embodiment of FIG. 4. The optical amplifier pump lasers are coupled to the amplifiers by the port 3 of the first optical circulator 93 for the second rare earth doped fiber 99; and to the port 1 of the second optical circulator 94 for the first rare earth doped fiber 98. Alternatively, one pump laser may be used and divided between port 3 of the first circulator 93 and port 1 of the second optical circulator 94.

Of course, numerous other embodiments may be envisaged which do not depart from the scope and spirit of this invention.

What we claim is:

1. A frequency dependent optical isolator having a first input/output port and a second input/output port consisting of:
   first means connected in series between the first and second input/output ports for allowing a first optical signal having a frequency $f_1$ to propagate from the first input/output port to the second input/output port and for at least substantially preventing a second optical signal having a frequency of $f_2$ from propagating from the first input/output port to the second input/output port;
   means connected in series with the first means, for preventing the first optical signal from propagating from the second input/output port to the first input port;
   second means connected in series between the first and second input/output ports for allowing a second optical signal to propagate from the second input/output port to the first input/output port and for at least substantially preventing the first optical signal from propagating from the second input/output port to the first input port; and,
   means connected in series with the second means for preventing the second optical signal from propagating from the first input/output port to the second input/output port.

2. A frequency dependent optical isolator as defined in claim 1 wherein the first means and the means connected in series with the first means comprises a first optical filter optically coupled with a first optical isolator, and wherein the second means and the means connected in series with the second means comprises a second optical filter coupled to a second optical isolator.

3. A frequency dependent optical isolator as defined in claim 2 wherein the first optical filter coupled with the first optical isolator is connected in parallel with the second optical filter coupled to the second optical isolator at the first and second input/output ports.

4. A frequency dependent optical isolator as defined in claim 2 further comprising amplifying means connected in series between the first and second input/output ports.

5. A frequency dependent optical isolator as defined in claim 1 wherein the first means and the means connected in series with the first means comprises a first optical wavelength division multiplexor optically coupled with a first optical isolator, and wherein the second means and the means connected in series with the second means comprises a second optical wavelength division multiplexor coupled to a second optical isolator.

6. A frequency dependent optical isolator as defined in claim 5 further comprising amplifying means connected in series between the first and second input/output ports.

7. A frequency dependent optical isolator as defined in claim 1 wherein the first means and the means connected in series with the first means comprises a first optical filter optically coupled with a first optical circulator, and wherein the second means and the means connected in series with the second means comprises a second optical filter coupled to a second optical circulator.

8. A frequency dependent optical isolator as defined in claim 7 further comprising amplifying means connected in series between the first and second input/output ports.

9. A frequency dependent optical isolator as defined in claim 1 including amplifying means connected in series with at least one of the first means and the means connected in series with the first means or connected in series with one of the second means and the means connected in series with the second means.

10. A frequency dependent optical isolator having a first input/output port and a second input/output port consisting of:
an optical circulator for directing a first optical signal having frequency $f_1$ from the first input/output port to a first optical filter and for directing the first optical signal reflected from the first optical filter to the second input/output port, the first filter not reflecting optical signals having a frequency $f_2$ towards the second input/output port, said optical circulator for directing a second optical signal having frequency $f_2$ from the second input/output port to a second optical filter and for directing the second optical signal reflected from the second optical filter to the first input/output port, the second filter not reflecting optical signals having a frequency $f_1$ towards the first input/output port.

11. A frequency dependent optical isolator for optically isolating a first optical signal having a frequency of $f_1$ and a second optical signal having a frequency of $f_2$ wherein the signals are being transmitted in opposite directions within an optical fiber, consisting of:
first means connected to the optical fiber for separating the signals so that the first signal propagates along a first path in a first direction and the second signal propagates along a second path in a second direction, the first and second paths being connected in parallel;
first means connected in series with the first path for preventing the first signal from propagating along the second path;
second means connected in series with the second path for preventing the second signal from propagating along the first path;
means connected in series with the first means for preventing the first signal from counter propagating along the first path in a reverse direction; and
means connected in series with the second path for preventing the second signal from counter propagating along the second path in a reverse direction.

12. The frequency dependent optical isolator as defined in claim 11 further comprising amplifying means for amplifying at least one of the first and second signals.

13. The frequency dependent optical isolator as defined in claim 12 wherein the amplifying means comprise amplifiers connected in series with the first and second path and connected in parallel with each other.

14. In a system where an optical fibre is interrupted at a first and a second branch point, the branch points being connected by a first and a second branch path, and wherein a first optical signal having a frequency of $f_1$ and a second optical signal having a frequency of $f_2$ are being transmitted in opposite directions within the optical fiber, a method of optically isolating the first and second signals comprising the steps of:
separating the signals so that the first optical signal propagates along the first branch path in a first direction from the first branch point to the second branch point and the second signal propagates along a second branch path in a second direction from the second branch point to the first branch point;
preventing a substantial amount of the first signal from propagating from the second branch point to the first branch point;
preventing a substantial amount of the second signal from propagating from the first branch point to the second branch point;
preventing a substantial amount of the first signal from counter propagating along the first branch path in a reverse direction; and
preventing a substantial amount of the second signal from counter propagating along the second branch path in a reverse direction.

15. The method as defined in claim 14 further comprising the step of amplifying at least one of the first and second signals.

16. A frequency dependent optical isolator having a first input/output port and a second input/output port comprising:
first means connected in series between the first and second input/output ports for allowing a first optical signal having a frequency $f_1$ to propagate from the first input/output port to the second input/output port and for at least substantially preventing a second optical signal having a frequency of $f_2$ from propagating from the first input/output port to the second input/output port;
means connected in series with the first means, for preventing the first optical signal from propagating from the second input/output port to the first input port;
second means connected in series between the first and second input/output ports for allowing a second optical signal to propagate from the second input/output port to the first input/output port and for at least substantially preventing the first optical signal from propagating from the second input/output port to the first input port; and,
means connected in series with the second means for preventing the second optical signal from propagating from the first input/output port to the second input/output port, said optical isolator being free of a path between the first input/output port and the second input/output port on which both the first and second signals my propagate from one port to the other.

* * * * *